United States Patent [19]

Tharp

[11] Patent Number: 4,563,277
[45] Date of Patent: Jan. 7, 1986

[54] APPARATUS FOR AERATING AND MIXING WASTE WATER

[75] Inventor: Charles E. Tharp, Boone County, Mo.

[73] Assignee: Environmental Dynamics, Inc., Columbia, Mo.

[21] Appl. No.: 675,992

[22] Filed: Nov. 27, 1984

Related U.S. Application Data

[63] Continuation-in-part of Ser. No. 434,848, Oct. 18, 1982, abandoned.

[51] Int. Cl.⁴ .................................................. C02F 3/02
[52] U.S. Cl. .................... 210/220; 210/238; 210/629; 261/122; 261/124
[58] Field of Search .............. 210/620, 629, 220, 232, 210/170, 195.3, 238; 261/122, 124

[56] References Cited

U.S. PATENT DOCUMENTS

| | | | |
|---|---|---|---|
| 3,182,978 | 5/1965 | Reilly | 210/220 |
| 3,193,260 | 7/1960 | Lamb | 210/220 |
| 3,347,537 | 10/1967 | Morgan | 210/220 |
| 3,530,990 | 9/1970 | Grimshaw | 210/220 |
| 3,923,657 | 12/1975 | Roser | 210/220 |
| 3,954,922 | 5/1976 | Walker et al. | 261/DIG. 70 |
| 3,956,432 | 5/1976 | Hilling | 261/122 |
| 4,005,015 | 1/1977 | Boware, Jr. | 210/220 |
| 4,051,035 | 9/1977 | Boschen | 210/220 |
| 4,215,082 | 7/1980 | Danel | 210/220 |
| 4,229,389 | 10/1980 | Granger | 210/220 |
| 4,288,394 | 9/1981 | Ewing | 210/220 |

FOREIGN PATENT DOCUMENTS

| | | | |
|---|---|---|---|
| 2447607 | 4/1976 | Fed. Rep. of Germany | 210/220 |
| 52-6170 | 1/1977 | Japan | 210/220 |
| 20259 | of 1914 | United Kingdom | 210/220 |

OTHER PUBLICATIONS

Gray/Carborundum Fine Air Brochure by The Gray Engineering Group.
Aeration: The U.S. Market Sparkles for a Canadian Company in Jul. 1981, issue of Water and Pollution Control Magazine Brochure entitled The Vitox System by The Gray Engineering Group.
Final Report–Oxygen Transfer and Headloss Characteristics of the Carborundum Dome . . . by Gerry Shell Environmental Engineers.

*Primary Examiner*—Ernest G. Therkorn
*Attorney, Agent, or Firm*—Kokjer, Kircher, Bradley, Wharton, Bowman & Johnson

[57] ABSTRACT

A plurality of aerators are arranged in a preselected pattern on the floor of a basin or lagoon containing waste water. Compressed air is supplied to the aerators by aeration pipes anchored by hanger brackets to the floor of the basin. Each aerator has a porous diffuser plate through which the air is passed and released into the waste water in the form of ultra fine air bubbles less than 60 microns in diameter. The air bubbles are generated in an intense manner with a high rate of air flow to increase the mixing action and liquid circulation pattern, and to create turbulent boils at the surface which provide surface aeration from atmospheric air and re-entrainment of air from eddy current circulation.

7 Claims, 13 Drawing Figures

APPARATUS FOR AERATING AND MIXING WASTE WATER

BACKGROUND OF THE INVENTION

This application is a continuation in part of my application, Ser. No. 434,848, filed on Oct. 18, 1982, now abandoned.

This invention relates generally to the treatment of waste water and deals more particularly with improvements in the application of ultra fine air bubbles to municipal and industrial waste water.

Various types of aeration and mixing devices have been used to treat municipal and industrial waste water, including mechanical devices which function as surface aerators. Surface aerators are active only at the surface of the waste water and do not effectively treat remote areas of the lagoon or basin. Due to the localized nature of surface aeration and inability to mix to the bottom in deep tanks or basins, there is a lack of uniform distribution of energy throughout the waste water and a corresponding lack of thorough mixing of the air with the liquid. Surface aerators are also generally low in efficiency and high in energy consumption, and they are characterized by frequent mechanical problems. In addition, surface aeration systems are lacking in flexibility and are difficult and expensive to maintain in good operating condition.

Aeration systems known as draft tube systems utilize a series of aeration tubes which extend vertically in the waste water basin. The tubes act as draft tubes, and air is applied internally to create air lift pumpage and aeration and pumped liquid. The draft tube systems dispense the air fairly widely throughout the basin but are plagued by high energy requirements. Furthermore, the draft tube system does not stand up well when subjected to prolonged use in the field.

Fine bubble technology is used in a third type of aeration system. In the fine bubble system, small air bubbles are generated and applied to the waste water. The fine bubbles have been generated by mechanical devices such as eductors which draw gas into the liquid by liquid pumpage. Rapidly rotating turbines and pumps have also been used to break up a stream of compressed air into fine air bubbles at the air release point of the system.

Another type of fine bubble aeration device that has been used to great advantage is an aeration unit having a 1 to 1½ inch thick porous diffuser plate of ceramic or sintered metal through which compressed air is forced. The aerator is submerged at or near the bottom of the waste water treatment basin, and the compressed air that passes through the small pores of the diffuser plate is released in the form of fine air bubbles which rise through the waste water to provide aeration. The diffuser plate aerator is generally more efficient in oxygen transfer than the other types of aerators that have been used, and it disperses the air bubbles more thoroughly throughout the waste water. The effective aeration that is achieved by the fine bubble system is due primarily to the relatively large areas of surface contact between the small air bubbles and the liquid.

Conventional fine bubble aeration systems are designed to maximize residence time of the compressed air bubbles in the liquid in order to maximize the oxygen transfer. The surface area of the diffuser media is normally maximized and liquid pumpage is minimized. The goal of the system is to widely dispense the air bubbles across the basin, cause the bubbles to rise slowly and independently through the waste water, and minimize directional flow by minimizing the intensity of the air flow. For example, conventional systems operate at an air flow rate of 0-8 cfm per square foot of diffuser media. Most common rates are 1 to 3 CFM per square foot.

Even though the approach taken by conventional systems maximizes the oxygen transfer of the air that is pumped through the diffuser media, there are no significant surface aeration effects since the slow rise rate of the bubble does not create appreciable turbulence at the surface. The non-directional effect resulting from the wide dispension and low rate of air flow lead to mixing problems and inefficiencies, particularly in low F/M systems where the F/M ratio is less than about 0.2 #BOD/#MLSS. In high rate activated sludge systems having a higher F/M ratio, existing fine bubble systems mix in an efficient and satisfactory manner for the most part. However, in low rate activated sludge systems or in aerated lagoon systems where the F/M ratio is extremely low, the oxygen demand can be satisfied at low energy levels which do not result in enough mixing the achieve proper interaction between the food and microorganisms. Therefore, in order to provide sufficient mixing to sustain the process, energy must be added beyond that required for aeration, and the energy requirements are increased accordingly. Net energy requirements for the conventional fine bubble system are substantially greater than the theoretical energy to dissolve oxygen.

All of the fine bubble aeration systems that have been available in the past for lagoons and low F to M ratios require rigid pipes and are thus rather costly to construct and install. Plastic pipe has not been used, primarily because of its susceptibility to significant expansion and contraction due to temperature changes. Attempts to use plastic pipe in lagoons or low F/M basins which fluctuate widely in temperature have been unsuccessful and have resulted in pipe breakage and failed connections caused by thermally induced expansion and contraction of the pipes when the temperature changes. Plastic pipe can expand and contract enough (several feet in some cases) to make it impractical for use in conventional fine bubble aeration systems which employ rigid connections throughout and are not able to accommodate thermal expansion and contraction of the pipe in lagoons and low F/M basins which fluctuate in temperature.

Conventional fine bubble systems for activated sludge applications (high F/M ratios) are also characterized by high initial costs and high operating costs. The aerators are arranged closely together and a large number of aerators is required to adequately treat a large basin. Lengthy rigid pipe air lines are necessary to hold the aerators, along with a large number of connecting devices for joining the aerators (diffusers) to the air lines. The diffuser units can become clogged so severely from build up of deposits that application of chemicals such as hydrochloric acid is required to clear them. The aerator devices which are submerged at the bottom of the basin are inaccessible and difficult to service. The porous diffuser media are often ceramic or sintered metal plates which have rough texture surfaces that offer little resistance to biological growth tending to clog their pores. The diffuser plates are normally thick enough (1 to 1½ inches) that the pores present tortuous paths which are easily clogged by debris in the air supply, again blocking the diffuser and reducing the effectiveness of the aeration.

Fine bubble systems have not been successfully applied to aerated lagoons. To employ conventional fine bubble system requires rigid air piping, strict elevation control of lagoon bottom, elevation control of air line, and strict elevation control for diffuser units. Costs to provide these features have been prohibitive because of the very large areas in lagoons. Air flow rates for fine bubble air systems are so low per unit that massive piping systems would be required.

Fine bubble aeration systems traditionally require considerable maintenance. Lagoons are not usually constructed in parallel to allow units to be removed from service for maintenance. Also, lagoons are so large that dewatering for maintenance is not practical. Since fine bubble systems are fixed in place and cannot be serviced or removed from the lagoon without dewatering, fine bubble aeration has not been a viable treatment option even though substantial energy savings would be possible. The fear of operating and maintaining fixed in plate fine bubble systems has effectively prevented their application to lagoons.

The aerators that have been used in fine bubble systems have also been unsatisfactory in a number of respects. Aerator units which employ stone (ceramic) media typically have the diffuser permanently bonded in place so that it cannot easily be replaced. Holding the aerator down and in place without air leakage has also been a problem.

SUMMARY OF THE INVENTION

The present invention provides an improved method and apparatus for treating waste water using fine bubble technology. In accordance with the invention, a series of improved aeration devices is arranged in a predetermined pattern or the bottom of an aeration basin, an activated sludge basin, or lagoon. The aerators may be arranged in a variety of patterns and may be spaced apart as desired. The aerators are connected with the main air supply lines by flexible hoses which are long enough to permit the aerators to be raised to the surface and serviced while the system remains in operation. The flexibility of the hoses is also important in accommodating thermal expansion and contraction of the main supply pipes. The air supply lines are preferably plastic pipes held down in the basin or lagoon by uniquely constructed brackets which are easily applied to and released from the air lines and which allow the plastic pipes to expand and contract unrestrained laterally due to thermal effects. This same piping arrangement using flexible hoses allows use of any type air supply pipe either alone or in combination i.e. cast iron, stainless, ductile iron, galvanized, PVC, polyethylene, etc. are all suitable.

It is an important feature of the invention and a departure from the prior art that the area of the diffuser media of the aerators is minimized. Also, the vertical velocity of the air bubbles is maximized by employing high air release rates per square foot of media at a relatively small number of locations. Even though this reduces the residence time of each bubble in comparison to conventional fine bubble systems, the reduced oxygen transfer resulting from shorter residence time is more than made up for by other factors. Due to the high liquid velocity, thorough mixing and suspension of solids is achieved without the need for additional input energy for mixing purposes. Also, the high velocity creates turbulent boils at the surface which cause significant surface aeration from atmospheric air above the basin. High pumpage rates also generate increased oxygen transfer rates by inducing eddy current re-entrainment of air bubbles at the interface of flow from adjacent units. Taking into account pumped air, diffusion, and surface aeration, the net oxygen transfer and mixing rate provided by the process of the present invention is greater than that achieved by conventional fine bubble systems, and the energy efficiency is likewise greater.

It is an important object of the invention to provide a method and apparatus for effectively aerating and mixing waste water in a manner to minimize the energy consumption. The needs of the biological process are adequately met while achieving substantial energy savings which become even more significant in view of expected increases in energy costs in the future.

Another object of the invention is to provide a method and apparatus of the character described which minimizes damage to biological colonies or floc in the waste water treatment basin.

Still another important object of the invention is to provide a waste water treatment method and apparatus which operates efficiently over a wide range of hydraulic and organic conditions. Unlike conventional fine bubble processes, the process of the present invention is well suited for use in both high F/M activated sludge systems and in low F/M dispensed growth lagoon systems.

A further object of the invention is to provide a waste water treatment system which can be quickly and easily installed in both new and existing basins. The flexibility of the system permits it to be installed in either an aerated lagoon or an aerated stablization pond having virtually any size and shape. Existing activated sludge basins can be converted to the system with substantial energy savings over course bubble aeration devices. New activated sludge applications can also utilize the invention.

Yet another object of the invention is to provide a waste water treatment system which distributes energy and air in a uniform manner and which can be accurately controlled as to the distribution pattern. Complete mix, plug flow, roll, and dispersed energy systems are all available with the invention.

An additional object of the invention is to provide a waste water treatment system in which the aerators can be removed for maintenance while the system remains in service.

A still further object of the invention is to provide a waste water treatment system of the character described which employs economical plastic pipe for the air supply lines submerged in the basin or lagoon system can be piped plastic only or combined with other piping systems to meet specific needs of the process. A unique anchor bracket which holds the pipes down can be quickly and easily applied to and removed from the aeration pipes and allows them to expand and contract virtually without limit. The use of these anchor brackets in combination with the flexible hoses which supply the aerators permits the system to use low cost plastic piping by divorcing the aeration unit from the fixed air piping system.

Still another object of the invention is to provide an improved aeration device for generating ultra fine air bubbles in a waste water treatment basin. The aeration device includes a thin and flexible porous diffuser plate which provides a high flow rate of air per unit surface area. It is an important feature of the invention that the diffuser plate is not susceptible to clogging, either by debris in the air supply or biological growth.

A further object of the invention is to provide an aeration unit which acts as its own ballast. The aerator can be installed using flexible air supply pipe, and the integral ballast holds the aeration unit and the flexible pipe in place. Self ballasting is necessary to allow divorce of aeration unit from the rigid air supply piping. The integral ballast also allows the unit to be moved or repositioned without disturbing system operations.

The plastic body of the aerator serves as a mold for the concrete ballast and takes advantage of the concrete for structural strength. This plastic body provides an economical construction form for economical installation. This plastic body seals the media from the wastewater to prevent fouling, allows easy replacement or maintenance of media, and minimizes stress on the media as media is installed prior to pouring concrete ballast. The plastic body protects the concrete ballast from damage and prevents air leakage through the concrete. The plastic body and integral ballast substitute for a precast concrete aeration body which would have limitations listed above.

Yet another object of the invention is to provide an aerator which is constructed to accept both ceramic and plastic diffuser plates. This interchangeability of the aerator body permits ceramic media to be used in some applications and plastic media to be used in others, and it results in economic benefits because different aerator bodies do not have to be constructed for the different diffuser media.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
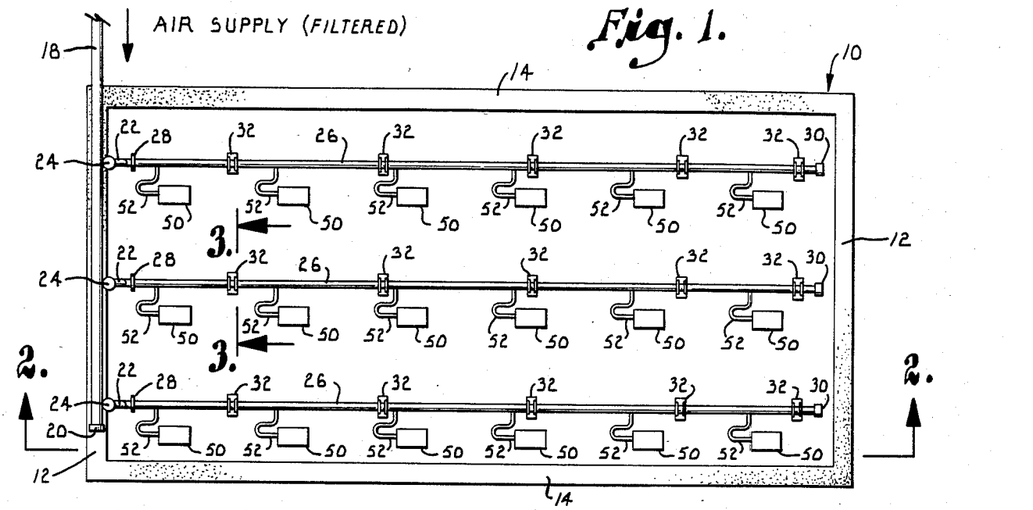
FIG. 1 is a top plan view showing the waste water aeration and mixing system of the present invention installed in a concrete basin in a typical activated sludge application.
Figure 2:
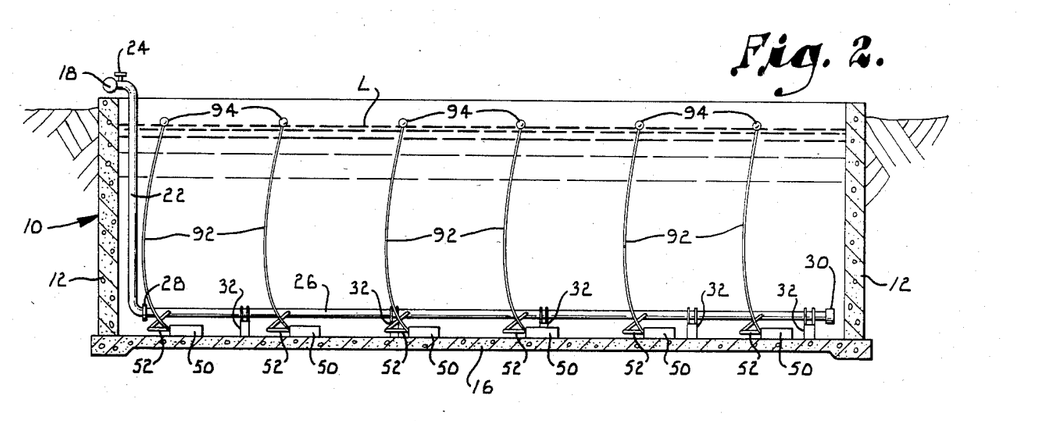
FIG. 2 is a sectional view taken generally along line 2—2 of FIG. 1 in the direction of the arrows.

Referring now to the drawings in more detail and initially to FIGS. 1 and 2, the present invention provides a method and apparatus for aerating and mixing waste water contained in a sunken concrete basin generally designated by numeral 10. The basin 10 has concrete end walls 12, side walls 14, and a floor 16. The basin 10 may be used in an activated sludge system having a relatively high F/M ratio (greater than about 0.05 #BOD/#MLSS). The letter L designates the liquid level of the waste water in the basin. The basin is generally open to the atmosphere at the top.

In accordance with the present invention, compressed air is filtered by central filtration equipment (not shown) and delivered to a main header pipe 18 having an end cap 20 on one end. The main supply pipe 18 extends along the top of one of the end walls 12 of the concrete basin. Branching away from the main pipe 18 at spaced apart locations are a plurality of carbon steel, stainless steel or ductile iron branch pipes 22 which are generally vertical pipes extending down into the basin 10 from the main pipe 18. Each of the branch pipes 22 may be equipped with a throttling valve 24 for controlling the flow into the branch pipe. The lower end of each pipe 22 is located adjacent the floor 16 of the basin and is elbowed to extend horizontally. Each branch pipe 22 connects at its lower end with an aeration pipe 26 (normally plastic) Steel to plastic adaptor connections 28 connect pipes 22 and 26 when plastic laterals are employed. The lateral aeration pipes 26 extend horizontally along the floor 16 and are spaced apart and parallel to one another, as best shown in FIG. 1. The pipes 26 extend the length of the basin 10 and are provided with end caps 30.

Each lateral aeration pipe 26 is held down adjacent the floor 16 by a plurality of anchor brackets 32. The brackets 32 are spaced apart along the length of each pipe 26 at 8-12 feet intervals. The spacing between adjacent pairs of pipes 26 is generally in the range of 10 to 20 feet. The brackets 32 are identical to one another.

Figure 3:
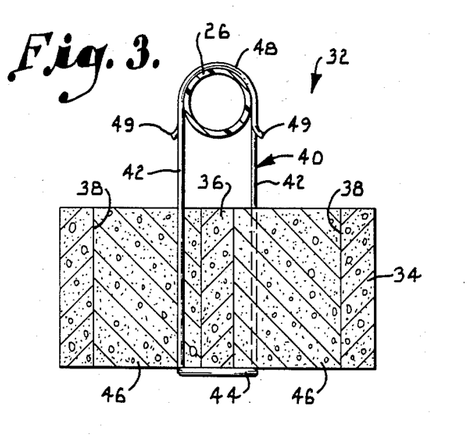
FIG. 3 is a fragmentary sectional view on an enlarged scale taken generally along line 3—3 of FIG. 1 in the direction of the arrows and showing one of the anchor brackets included in the system.
Figure 4:
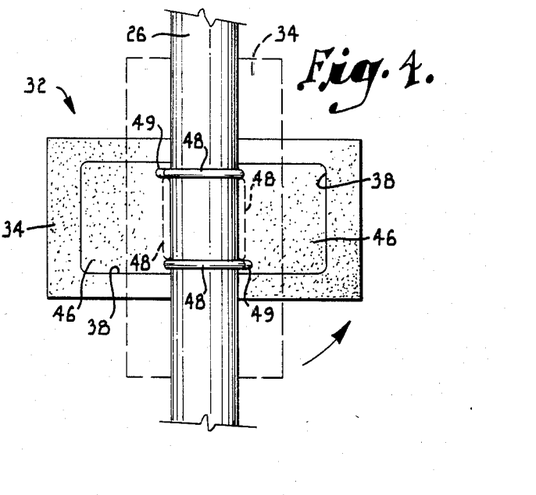
FIG. 4 is top plan view of the anchor bracket shown in FIG. 3, with the broken lines illustrating the bracket released from the aeration pipe.

Referring now to FIGS. 3 and 4 in particular, each anchor bracket 32 includes a conventional concrete block 34 having a central transverse web 36 separating the hollow interior of the block into spaced apart openings 38. A stainless steel pipe hanger 40 includes a pair of vertical bracket arms 42 which are connected at their lower ends by a horizontal bight portion 44 of the hanger. The bracket arms 42 are spaced apart a distance greater than the diameter of the lateral aeration pipe 26. Arms 42 extend upwardly through the openings 38 in the concrete block on opposite sides of web 36. The bight portion 44 underlies web 36 and angles between the lower ends of the bracket arms 42. The openings 38 in the concrete block are filled with concrete 46 which acts as ballast. The bracket arms 42 are embedded in the concrete 46 to secure the pipe hanger in place.

The upper ends of bracket arms 42 are provided with opposed hooks 48 which curve in opposite directions. Each hook 48 opens downwardly and is large enough to closely receive the aeration pipe 26, as shown in FIG. 3. Each hook has an out turned free end 49 which is spaced above block 34 a distance greater than the diameter of pipe 26.

Each bracket 32 is applied to the proper aeration pipe 26 by initially positioning the block 34 as shown in broken lines in FIG. 4. In this position, the long axis of the block is parallel with the axis of the aeration pipe 26, and the aeration pipe extends between the upper portions of the bracket arms 42. Block 34 is then rotated through 90° to the solid line position shown in FIG. 4, as indicated by the directional arrow. The free ends 49 of hooks 48 clear the top of the pipe 26, and the opposing hooks 48 are aligned directly above the aeration pipe. When the pipe is thereafter raised, it fits closely in both of the hooks 48 and is firmly gripped therein and prevented from floating upwardly away from the floor 16 of the basin. The concrete ballast 46 and block 34 together have enough weight (approximately 85 lbs.) to anchor bracket 32 down on the floor 16 of the basin. The brackets 32 accommodate thermal expansion and contraction of the aeration pipes 26 without affecting the location or operation of the aeration units 50 supplied by the pipes and without unduly stressing any of the pipes or connections. Because of the fit of the plastic pipes 26 in the hooks 48, the pipes can expand and contract longitudinally virtually without limit, and the significant length changes that occur in the plastic pipes due to the wide temperature changes that can be encountered are thereby accommodated without unduly stressing the pipes and without disturbing the aeration device.

Each of the lateral aeration pipes 26 supplies compressed air to a plurality of aeration units 50 which are identical to one another. A flexible hose 52 directs the air to each aeration unit 50 from the corresponding pipe 26. One end of each hose 52 connects with the aeration unit, and the opposite end of the hose has a T connection with the aeration pipe 26. The aeration units supplied by each pipe 26 are spaced apart at intervals of 4-15 feet.

Each hose 52 has a length at least as great as the distance between the pipe 26 and the surface of the waste water for those systems using float and rope accessories. Consequently, each hose is long enough to permit the associated aeration unit 50 to be raised to the surface of the waste water for servicing while the aeration system remains in operation. This feature permits the system to remain on line while servicing of the individual aeration units is carried out. The flexibility of the hoses 52 also allows the aeration units to remain in place when the plastic pipes 26 expand and contract due to thermal effects.

Figure 5:
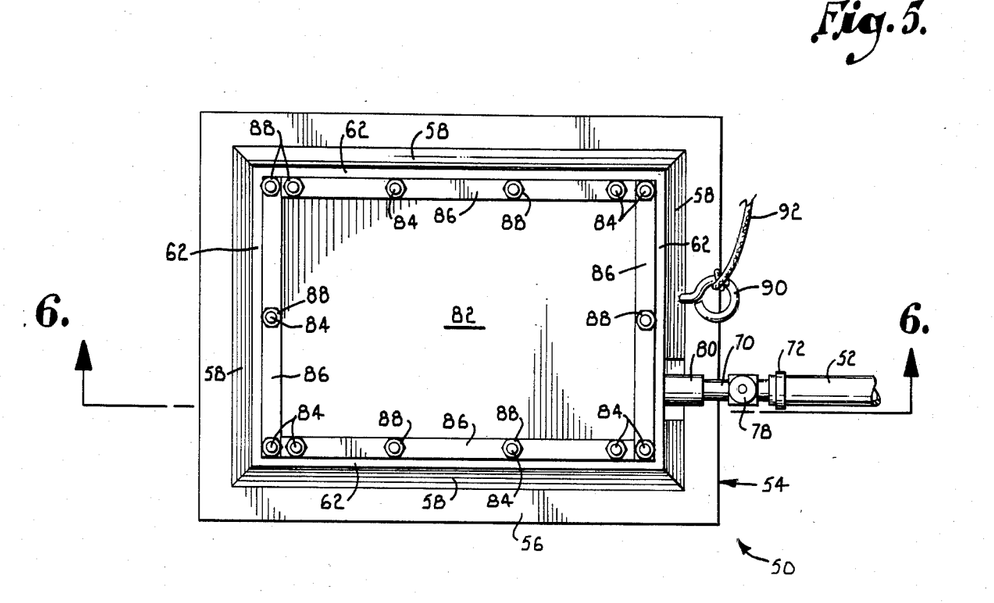
FIG. 5 is a top plan view on an enlarged scale showing one of the aeration units included in the system.
Figure 6:
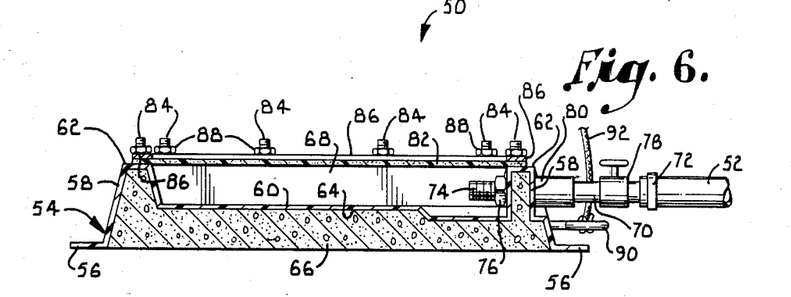
FIG. 6 is a sectional view taken generally along line 6—6 of FIG. 5 in the direction of the arrows.

Referring now to FIGS. 5 and 6 in particular, the body of each aeration unit 50 is formed by a thin plastic shell 54. A flat flange on the periphery of shell 54 provides a stable base 56 which rests on the floor 16 of the basin. Inside of the base 56, shell 54 is shaped to provide a continuous upstanding wall 58 which surrounds a generally horizontal deck 60. The deck 60 is elevated above base 56 but is lower than a horizontal ledge 62 formed on top of the wall 58.

The area located below deck 60 and within the wall 58 defines a ballast compartment 64. The ballast compartment 64 is filled with concrete 66 which serves as ballast to hold the aerator unit down on the floor of the basin. The concrete 66 fills the interior of wall 58 and has a flat bottom surface which is coplanar with the base 56. The shell 54 serves as a form or mold into which the concrete can be poured, usually at the site of the installation. The concrete acts to provide the aerator body with the necessary structural strength and ballast weight.

The area above deck 60 and within the wall 58 provides an air chamber 68 which receives the compressed air supplied through the flexible hose 52. The end of hose 52 is clamped to a plastic inlet fitting 70 by a hose clamp 72. The fitting 70 extends through wall 58, and its end is threaded at 74 to receive a retainer nut 76 which secures the inlet fitting to the body of the aerator unit. Fitting 70 may be equipped with a balancing valve 78 which can be adjusted to control the flow of air into the air chamber 68. Fitting 70 may also have a check valve 80 which permits the flow of air into air chamber 68 but prevents back flow out of air chamber. The check valve 80 prevents the entry of water and debris into the piping when the aeration device is shut down or inactive for extended periods.

The top of the air chamber 68 is covered by a flexible plastic diffuser plate 82 which rests on top of ledge 62 at its periphery. Stainless steel anchor bolts 84 which are embedded in the concrete ballast 66 project upwardly through the periphery of the diffuser plate 82. The periphery of the diffuser plate is held down on ledge 62 by stainless steel straps 86 which also receive the anchor bolts 84. Stainless steel nuts 88 are threaded onto bolts 84 and are tightened down against the straps 86 in order to secure the diffuser plate 82 in place. Plate 82 is generally parallel to the deck 60.

The plastic diffuser plate 82 is a porous plate having a porosity or void ratio of at least 40%. The diffuser plate has a large number of small pores which are less than 60 microns in diameter and which are about 35 microns in diameter on average. The thickness of plate 82 is less than one half inch in order to reduce the length of the path that is taken by air passing through its pores. At the same time, the plate is thin enough to readily flex due to abrupt changes in the air pressure. The flexibility of the plate permits it to flex when the air supply is interrupted and then resumed, and the periodic flexing of the plate dislodges any biological growth that would otherwise tend to build up. The use of a thin plate also reduces the pressure losses during operation.

An alternative diffuser medium may comprise a ceramic diffuser plate which can be used interchangeably with the plastic plate 82. By allowing plastic and ceramic diffuser plates to be used interchangeably, the aerator body of the present invention achieves the economic benefits of interchangeability and at the same time permits one type of diffuser medium to be replaced with the other type if called for by the particular application. For example, although the plastic diffuser medium has the advantages previously suggested, for relatively large diffuser plates (such as 1'×4'), ceramic media may be preferred because of their rigidity. Ceramic media may also be preferred to match existing equipment in a plant retrofit application.

In any case, the diffuser plate is not permanently bonded to the aerator body but is instead sealed thereto by a flexible mastic sealant gasket which can be easily cut and/or repaired so that the diffuser plate can be removed and replaced. For the flexible polyethylene media the stainless steel retainer straps held the media against the sealant material. As an alternative to the connection system which uses the metal straps 86, the ceramic diffuser plate can be sized such that its edge rests on ledge 62 immediately inwardly of bolts 84. Then, small stainless steel retainer clips (not shown) can be secured on the bolts by nuts 88 with the retainer plates overlapping the diffuser plate to hold it on the aerator body.

An eyebolt 90 may be embedded in the concrete ballast 66 of each aeration unit. The eye bolt projects from one end of the aerator body, and a flexible rope 92 may be tied to each eye bolt. Each rope 92 has a length greater than the depth of the waste water so that it can extend to the surface with the aerator on the floor 16 of the basin. A floating rope 94 (FIG. 2) is tied to the top end of each rope 92 and floats on top of the waste water. The aerator units 50 can be raised to the surface for servicing simply by pulling the corresponding ropes 92. Each rope 92 is formed from a substance that does not deteriorate when exposed to the waste water.

In operation of the aeration system, compressed air is supplied to the main header pipe 18 and is directed through the branch pipes 22 to the lateral aeration pipes 26. The throttling valves 24 permit the flow rates to the various aeration pipes 26 to be controlled as desired. Normally, each pipe 26 will receive the same amount of air, although special distribution patterns are possible.

The air in the aeration pipes 26 passes through the flexible hoses 52 to the aeration units 50. Normal design uses a flow control orifice at each unit; however, an optional air balancing valve 78 can be substituted to adjust the air supply to each aeration unit 50. By properly sizing flow control orifices or properly adjusting the balancing valves 78, the system can be controlled in a manner to compensate for variations in the elevation of the basin floor and to prevent starving of the aeration units that are far downstream in a system having long aeration pipes. Normally, the same amount of air is supplied to each aeration unit, although other distribution patterns are possible.

The compressed air that is supplied to each aeration unit 50 enters the air chamber 68. The pores in the plastic diffuser plate 82 (or the ceramic diffuser plate) provide the only means of egress of air from the air chamber, and the air passes through the diffuser plate and is released therefrom in a series of ultra fine air bubbles. For the plastic media each bubble has a diameter less than 60 microns and 35 microns is the normal bubble size. Ceramic media is normally rated in permeability using standard tests developed by the industry. Bubble size may be different versus plastic media. The air bubbles rise through the waste water to provide the desired aeration and mixing action. Due to the small size of the ultra fine air bubbles, there are large areas of surface contact between the air and liquid, and the transfer of oxygen to the waste water is thus effectively carried out. Since the aerator units 50 are at discrete locations, the bubbles are released from a plurality of discrete locations distributed on the floor of the basin.

The fine bubbles are generated from the aerator units 50 in a highly intense manner. The flow rate of air through each diffuser plate 82 is between 3 and 50 cfm per square foot of surface area presented on the diffuser plate, depending upon the particular application of the system. The highly intense manner in which the fine air bubbles are generated provides agitation and mixing of the liquid, resulting in a high liquid velocity. The liquid is thus mixed in a thorough manner and solids are maintained in suspension without the need to provide added energy for the purpose of mixing of the waste water.

The rapid rise rate of the air bubbles and the high liquid velocity creates a large turbulent boil of liquid at the surface of the waste water above each aerator unit. The turbulent boil results in substantial surface aeration from atmospheric air above the basin and draws atmospheric air into the waste water. The intense application of fine air bubbles at a relatively small number of locations produces a net oxygen transfer and mixing rate that is superior to conventional fine bubble systems when pumped air, diffusion, surface aeration, and secondary eddy current entrainment are all taken into account.

The individual aeration units 50 are spaced apart from one another to a greater extent than in conventional fine bubble systems. By releasing air at high rates from a relatively small number of discrete locations that are widely spaced, improved liquid circulation patterns are achieved. The turbulent circulation patterns of the air bubbles that are released from adjacent aerators impinge against and overlap and interact with one another to provide improved mixing plus eddy current re-entrainment of air for improved aeration. At the same time, high pumpage rates of the aerator units distribute air and energy uniformly throughout the basin 10.

Using discrete locations that create major directional pumpage, considerable process control can be developed using the invention. Installation of the units on a uniform grid pattern, FIGS. 9, 10 and 13, create a true "complete-mix" system with backmix capabilities. Only the proposed fine bubble system can offer this process capability with fine bubble diffusion. An alternate placement geometry of the aeration units allows "plug flow" process design, FIGS. 11 and 12. All current fine bubble systems offer only plug flow capability.

Figure 7:
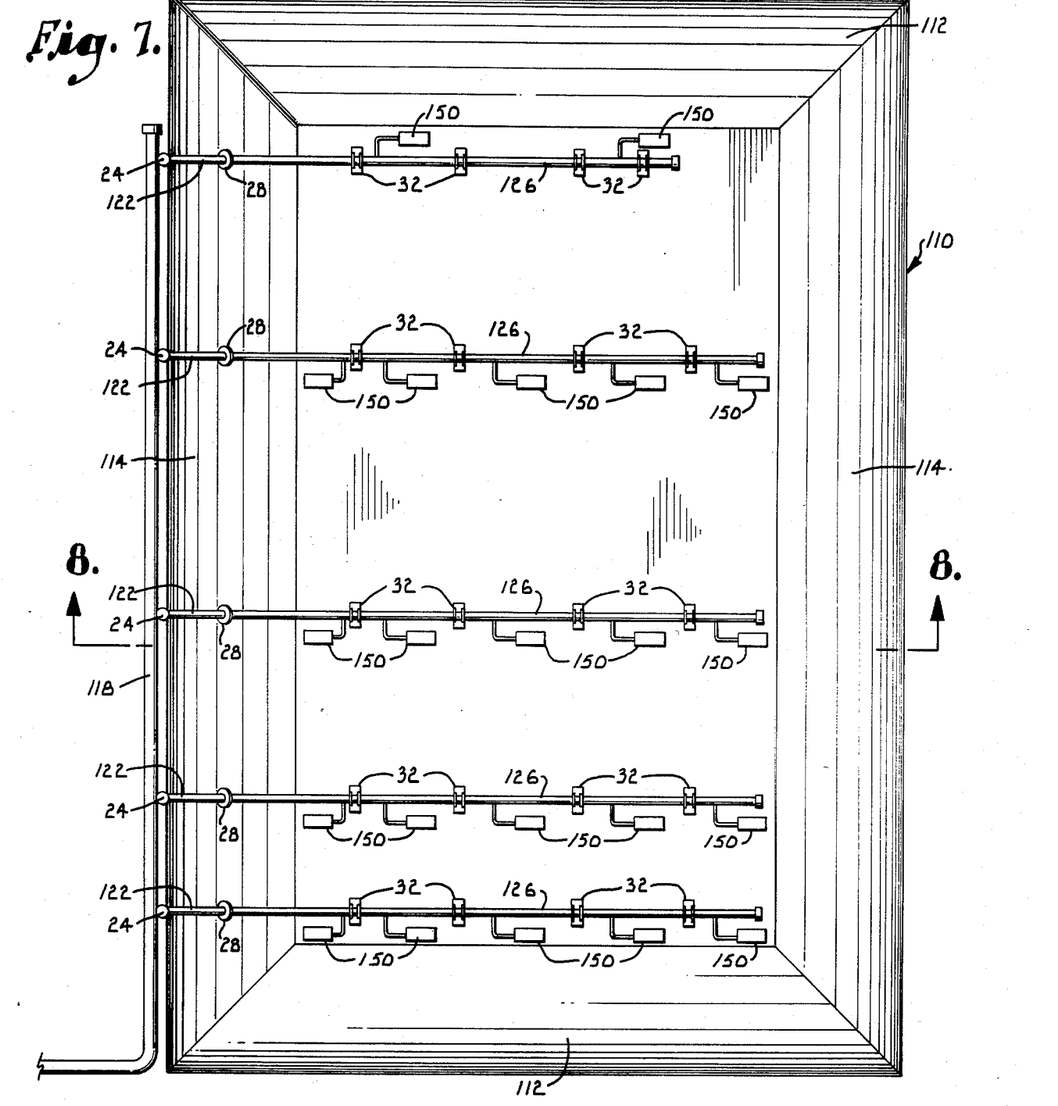
FIG. 7 is a top plan view showing the aeration system installed in an earth basin or a typical lagoon application (low F/M system)
Figure 8:
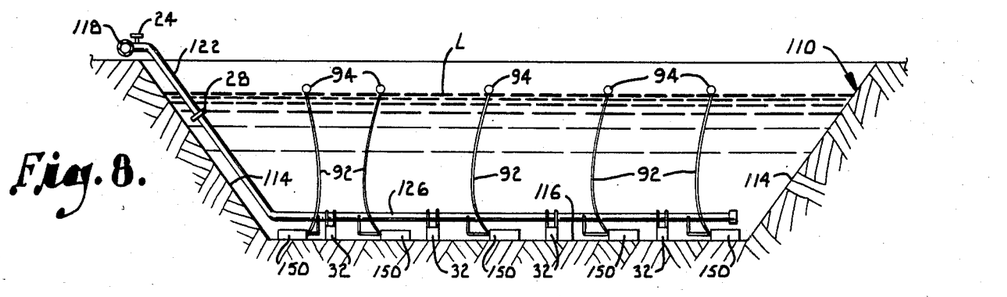
FIG. 8 is a sectional view taken generally along line 8—8 of FIG. 7 in the direction of the arrows.

The method and apparatus of the present invention is equally well suited for use in relatively low F/M systems such as the typical lagoon application shown in FIGS. 7 and 8. Numeral 110 generally designates a lagoon having sloping ends 112, sloping sides 114, and a generally horizontal bottom 116.

The aeration system for lagoon 110 is for the most part the same as the system for the concrete basin 10, and the same reference numerals are used in FIGS. 7 and 8 for components that are identical to those used in the basin shown in FIGS. 1 and 2. The aeration system of the present invention is installed in the lagoon 110 in essentially the same manner as in the concrete basin 10 shown in FIGS. 1 and 2. However, the lateral aeration pipes 126 extend across the width of the lagoon 110 and are spaced apart more widely than in the activated sludge application. Also, the steel, stainless, or ductile iron branch pipes 122 which connect with the main header pipe 118 incline in a manner to conform generally with the incline of the side walls 114. The aerator units 150 used in the lagoon application are identical to the aerators 50 described previously, although the lagoon aerators 150 are normally spaced apart from one another at 20–200 foot intervals due to the low F/M ratio and low oxygen uptake rate of the waste water in the lagoon.

The aeration system operates in the lagoon (low energy/unit basin volume) application in the same manner as in the activated sludge application. The thorough mixing generated by the high pumpage rates and directional flow per unit, plus air distribution throughout the lagoon makes the process efficient in the dispersed growth biological system as well as in the activated sludge application (high energy/unit basin volume).

The method and apparatus of the present application is flexible enough to accommodate variations in the system loading, season of the year, and type of aerobic process desired. At the same time, the capital cost of the equipment is relatively low since only a relatively few aerator units are required. The maintenance requirements are also reduced due to the ease with which the aerators can be serviced while the system remains in operation. Due to its improved efficiency, the energy costs of operating the system are also reduced. It is again pointed out that the system can be installed in both new and existing biological reactors.

When the aeration units are used in an earthen basin or lagoon, the large area flat base protects the underlying surface against erosion. The anti-erosion effect is unnecessary in concrete basins such as the basin 10. If additional protection against erosion is desired in an earthen basin, a flat plastic plate (not shown) can be bolted to the flange or base 56 of each aeration unit. This plate extends beyond the base 56 to the extent desired, and it shields the underlying surface against erosion.

FIGS. 9–13 show alternative arrangements for the installation of the waste water treatment system in concrete basins. In each arrangement, the aeration units 50 may include either plastic media or ceramic diffuser plates having approximate dimensions of 1'×4' to present 4 square feet of diffuser media surface on each aerator, in comparison to the conventional fine bubble aeration practice in which the diffuser surface area is ½ square foot or less (normally 7 inch to 9 inch diameter plates or domes).

Figure 9:
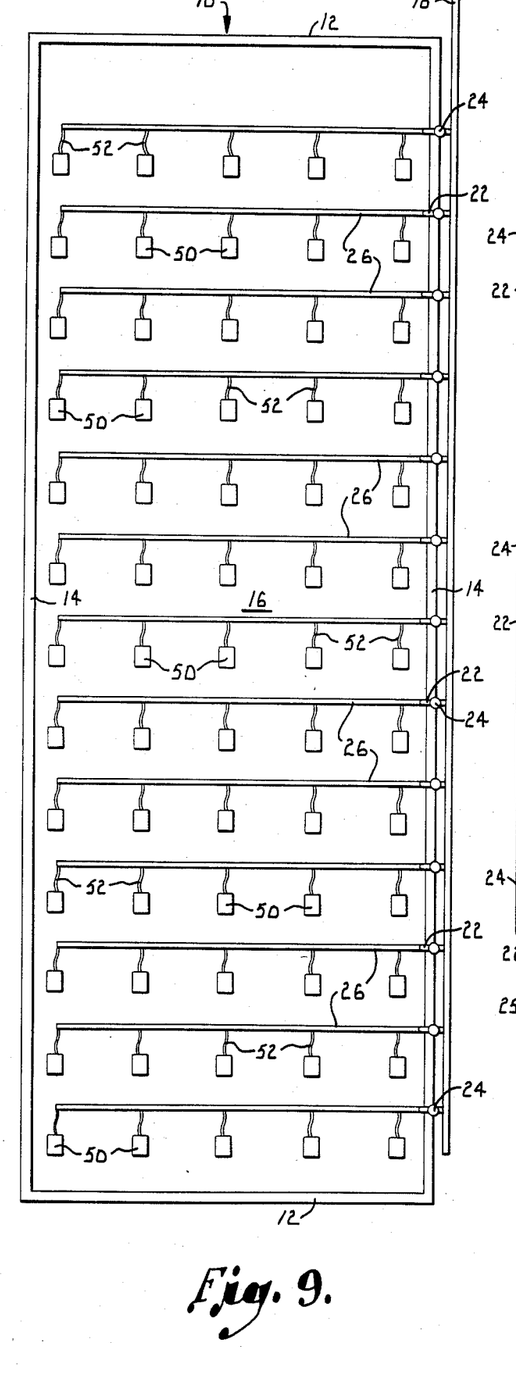
FIG. 9 is a diagrammatic top plan view showing a grid arrangement (complete-mix) of aeration units in a basin, with each air lateral having a throttling valve.

For the most part, the components of the arrangements shown in FIGS. 9–13 are identical to the components described previously, and the same reference numerals are used in FIGS. 9–13 to identify components similar to those described previously. Referring first to FIG. 9, the aerators 50 are arranged in a grid pattern and are supplied with air from flexible hoses 52 which extend from the submerged plastic air laterals 26. The lateral pipes 26 are parallel to one another and extend across the basin 10 generally between the side walls 14. At one end, each plastic lateral pipe 26 connects with a steel branch pipe 22. Each branch pipe is equipped with a throttling valve 24 and receives air from the main supply pipe 18. The plastic pipes 26 are held down and allowed to expand and contract longitudinally by hold down brackets which may be identical to the brackets 32. The flexible hoses 52 need not be long enough to reach to the surface, but their flexibility accommodates expansion and contraction of the plastic pipes 26 without affecting the location of the aerators. It is contemplated that the aerators will be spaced apart about 3–10 feet from one another. A typical installation will include 13 laterals with 5 aerators supplied by each lateral (65 total aerators).

Figure 10:
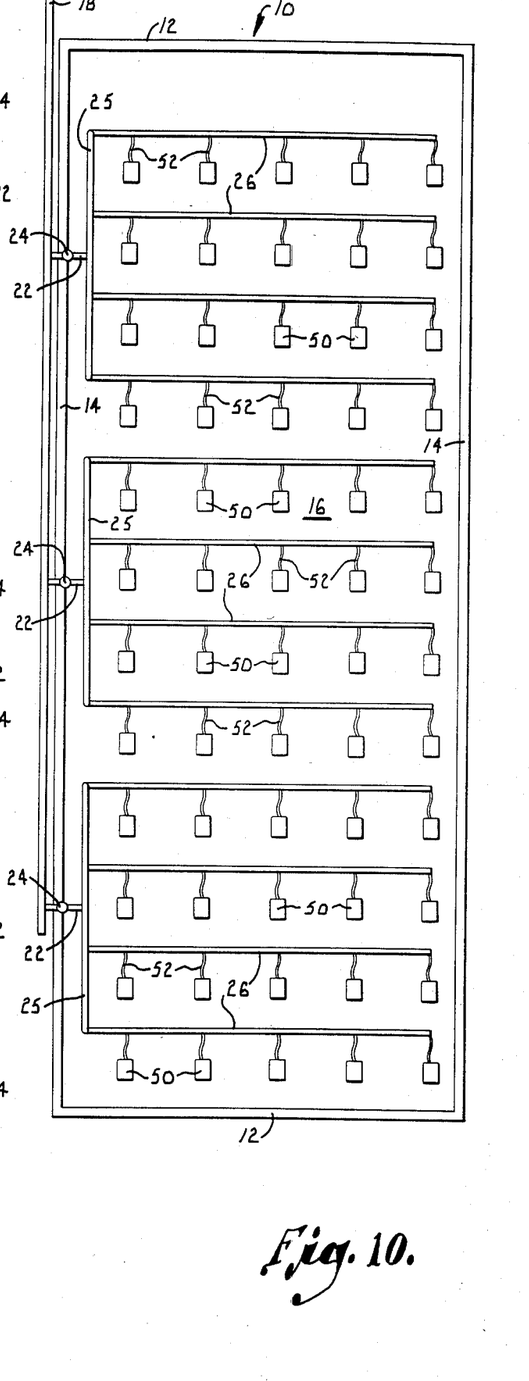
FIG. 10 is a diagrammatic top plan view showing an alternative grid arrangement (complete-mix) of aeration units, with each throttling valve serving a plurality of air laterals (system zoning)

FIG. 10 illustrates a grid arrangement which is similar to that of FIG. 9, except that the lateral pipes 26 are arranged in groups of four and each group is supplied by a header pipe 25. The header pipes are in turn supplied by branch pipes 22 each equipped with a throttling valve 24. In the FIG. 10 arrangement, there are typically 3 groups (zones) of four laterals each supplying 5 aerators 50 (60 total aerators).

Figure 11:
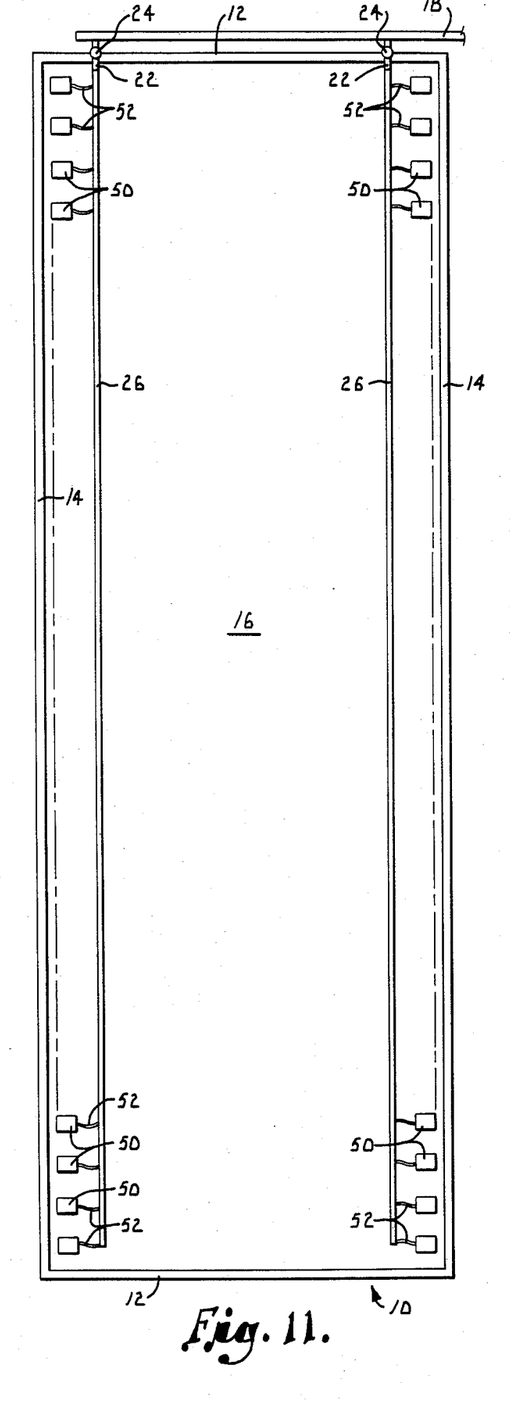
FIG. 11 is a diagrammatic top plan view showing an installation having a pair of air supply pipes extending along opposite sides of a basin and each serving a number of aeration units arranged to effect a roll pattern (plug flow) of aeration from each side toward the center of the basin.
Figure 12:
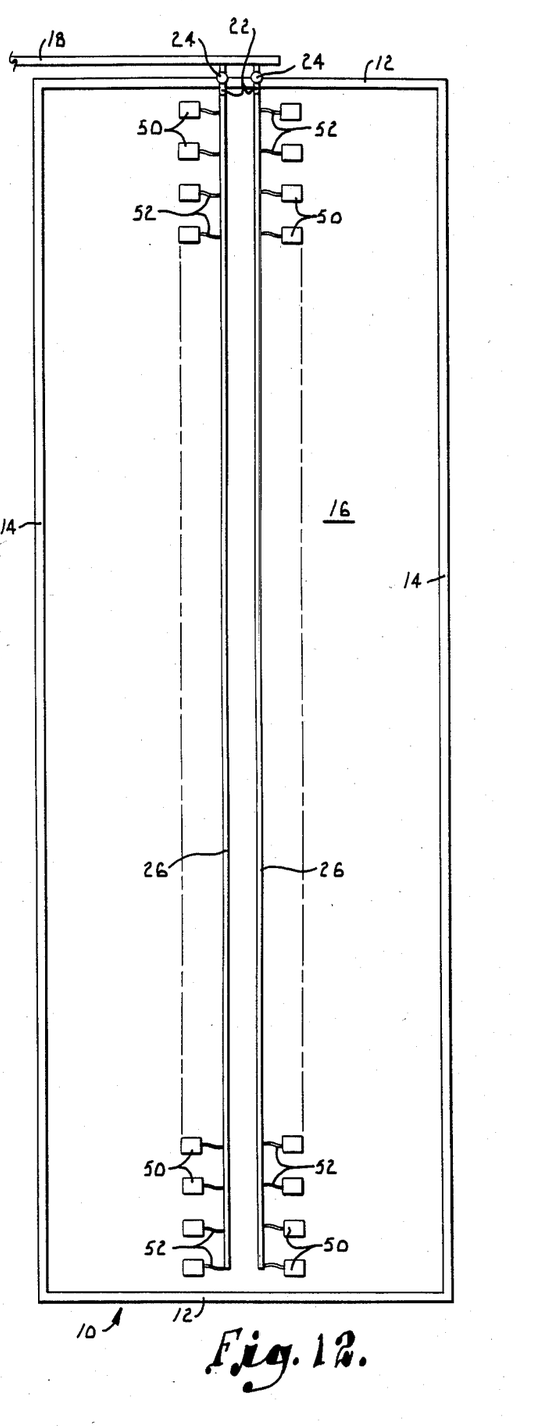
FIG. 12 is a diagrammatic top plan view showing an installation having a pair of parallel supply pipes extending down the center portion of a basin and each serving a number of aeration units arranged to effect a roll pattern (plug flow) of aeration from the center toward each side of the basin.

FIG. 11 shows an arrangement which includes only 2 plastic pipes 26 extending longitudinally in the basin 10 generally between the end walls 12. The pipes 26 are located near the side walls 14 and supply a plurality of aerators 50. FIG. 12 shows an arrangement similar to that of FIG. 11, except that the plastic pipes 26 extend generally down the center portion of the basin rather than along the side walls. Due to the locations of the pipes 26, the aeration pattern is a roll pattern from both sides toward the center of FIG. 11 and a roll pattern from the center toward both sides in FIG. 12.

Figure 13:
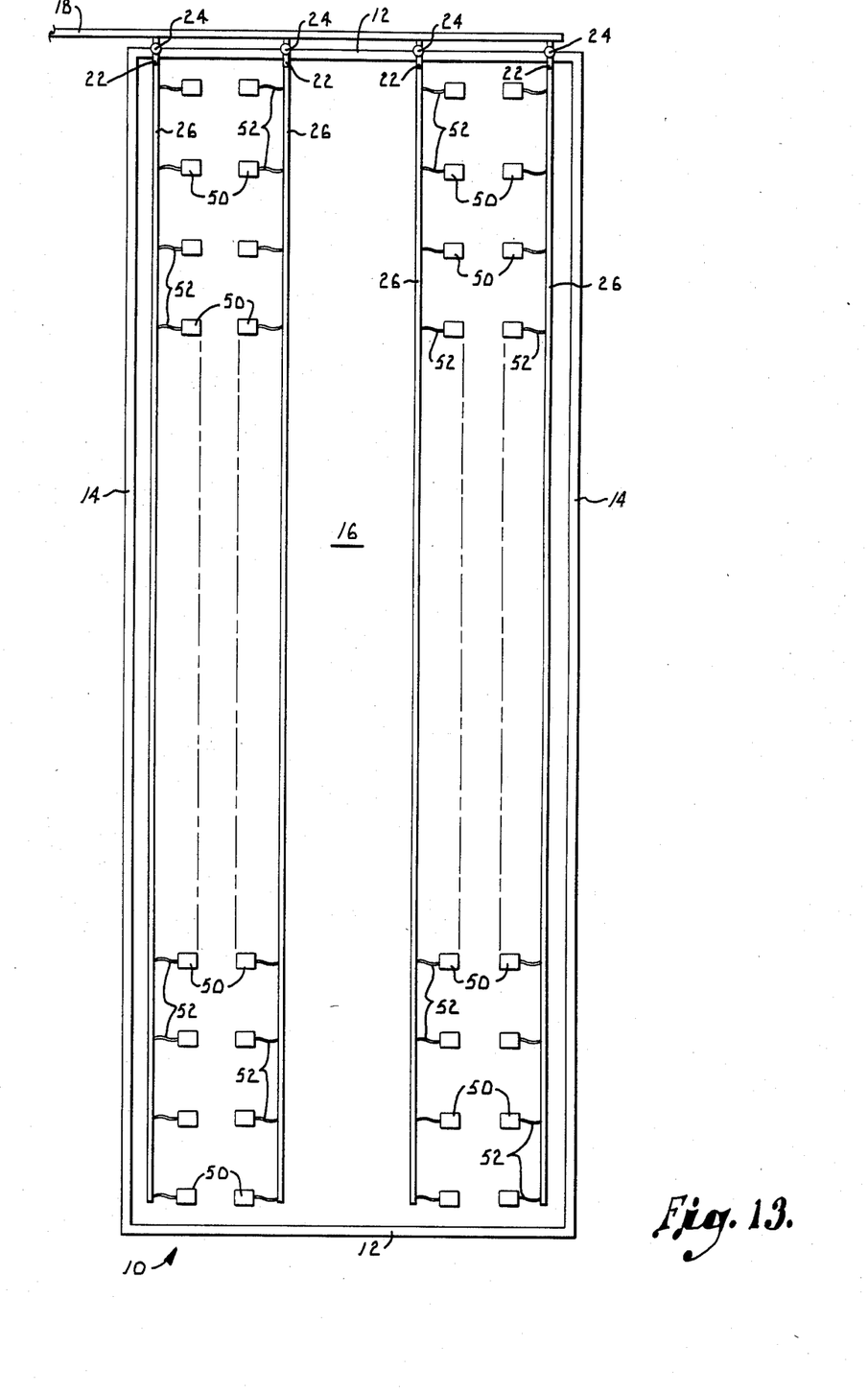
FIG. 13 is a diagrammatic top plan view showing another grid (complete-mix) arrangement of aeration units in which the air supply pipes extend longitudinally in a basin and each serve a number of aeration units.

FIG. 13 shows a grid arrangement in which four plastic pipes 26 extend parallel to one another longitudinally in the basin 10. Each pipe 26 serves a number of aerators 50, and the aerators are thus arranged in a grid pattern to achieve thorough mixing of the air with the waste water.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. Apparatus for aerating waste water in a basin, said apparatus comprising:

a main supply pipe for receiving the air under pressure;

a plurality of branch pipes each communicating with said main supply pipe to receive air therefrom, each branch pipe extending generally along the bottom of the basin and each branch pipe being a plastic pipe subject to longitudinal expansion and contraction in response to temperature changes in the waste water;

a plurality of aerators for each branch pipe, each aerator and being adapted to release a plurality of fine air bubbles when air is supplied to the aerator and each aerator being provided with ballast to hold the aerator down on the bottom of the basin;

a flexible conduit connecting each aerator with the corresponding branch line to provide communication between the branch lines and the corresponding aerators, thereby applying air to the aerators for release of air bubbles therefrom to effect aeration of the waste water, wherein each flexible conduit has a length at least as great as the distance between the corresponding branch pipe and the surface of the waste water to permit each aerator to be raised to the surface of the waste water while the corresponding branch pipe remains on the bottom of the basin and connected to the flexible conduit;

a flexible line for each aerator connected therewith at one end and having an opposite end disposed at the surface of the waste water;

a float for each line connected with said opposite end thereof, said floats floating on the surface of the waste water to maintain said lines accessible from the surface for lifting of the aerators to the surface of the waste water; and at least one hold down bracket for each branch pipe provided with ballast to hold the bracket down on the bottom of the basin, said bracket having means for holding down the branch pipe while permitting the branch pipe to longitudinally expand and contract, whereby said brackets accommodate thermally induced expansion and contraction of the branch pipes and said flexible conduits allow the aerators to remain stationary as the branch pipes expand and contract.

2. Apparatus as set forth in claim 1, including valve means associated with each branch pipe for controlling the flow of air thereto from the main supply pipe.

3. Apparatus as set forth in claim 2, including valve means associated with each aerator for controlling the flow of air thereto from the corresponding branch pipe.

4. Apparatus as set forth in claim 1, wherein each of said aerators includes:

an aerator body;

weighted ballast on said aerator body providing same with sufficient weight to remain on the bottom of the basin;

means providing an enclosed air chamber on said aerator body communicating with the corresponding flexible conduit to receive air therefrom; and a porous medium overlying said air chamber on the aerator body, said porous medium having a plurality of small pores providing the sole egress from said air chamber, whereby air is discharged from said air chamber through said pores to release a plurality of fine air bubbles into the basin for aeration of the waste water therein.

5. Apparatus as set forth in claim 4, wherein said ballast comprises concrete and said aerator body serves as a mold for receiving the concrete.

6. Apparatus as set forth in claim 1, wherein said bracket comprises:

a weighted ballast block having a pair of bracket arms extending generally upwardly therefrom and spaced apart from one another a distance at least as great as the diameter of the branch pipe to permit the pipe to extend between the bracket arms; and a pair of opposing hooks on the respective bracket arms for receiving the pipe, said hooks opening downwardly and extending in opposite directions and each having a free end spaced above the block a distance at least as great as the diameter of the pipe, whereby the bracket can be applied to the pipe by positioning said block adjacent the pipe with the pipe extending between said bracket arms, thereafter rotating the block to position said hooks above the pipe with the free ends of each hook clearing the pipe and the hooks aligned with the pipe axis, and finally inserting the pipe into the hooks.

7. Apparatus as set forth in claim 6, wherein:

said ballast block is a concrete block having an open interior and a web portion dividing said interior into a pair of openings;

said bracket arms extend upwardly through the respective openings in said block on opposite sides of said web portion;

said bracket arms are interconnected by a bight portion of the bracket extending beneath said web portion of the block; and said openings in the block are substantially filled with ballast material in which portions of the bracket arms are embedded.

* * * * *

REEXAMINATION CERTIFICATE (2977th)
United States Patent [19]
Tharp

[11] B1 4,563,277
[45] Certificate Issued Aug. 27, 1996

[54] APPARATUS FOR AERATING AND MIXING WASTE WATER

[75] Inventor: Charles E. Tharp, Boone County, Mo.

[73] Assignee: Environmental Dynamics, Inc., Columbia, Mo.

Reexamination Request:
No. 90/004,087, Dec. 26, 1995

Reexamination Certificate for:
Patent No.: 4,563,277
Issued: Jan. 7, 1986
Appl. No.: 675,992
Filed: Nov. 27, 1984

Related U.S. Application Data

[63] Continuation-in-part of Ser. No. 434,848, Oct. 18, 1982, abandoned.

[51] Int. Cl.$^6$ .................................................. C02F 3/02
[52] U.S. Cl. .................. 210/220; 210/238; 210/629; 261/122.1; 261/124
[58] Field of Search .................. 210/620, 629, 210/220, 232, 238, 170, 195.3; 261/122.1, 122.2, 124

[56] References Cited

U.S. PATENT DOCUMENTS

| | | | |
|---|---|---|---|
| 3,182,978 | 5/1965 | Reilly | 210/220 |
| 3,193,260 | 7/1965 | Lamb | 210/220 |
| 3,347,537 | 10/1967 | Morgan | 210/220 |
| 3,530,990 | 9/1970 | Grimshaw | 210/220 |
| 3,923,657 | 12/1975 | Roser | 210/220 |
| 3,954,922 | 5/1976 | Walker | 261/DIG. 70 |
| 3,956,432 | 5/1976 | Hilling | 261/122 |
| 4,005,015 | 1/1977 | Boware | 210/220 |
| 4,051,035 | 9/1977 | Baschen | 210/220 |
| 4,215,082 | 7/1980 | Danel | 210/220 |
| 4,229,389 | 10/1980 | Granger | 210/220 |
| 4,288,394 | 9/1981 | Ewing | 210/220 |

FOREIGN PATENT DOCUMENTS

| | | | |
|---|---|---|---|
| 2447607 | 4/1976 | Germany | 210/220 |
| 526170 | 1/1977 | Japan | 210/220 |
| 20259 | 9/1914 | United Kingdom | 210/220 |

OTHER PUBLICATIONS

Gray/Carborundum Fine Air brochure by The Gray Engineering Group.

Aeration: The U.S. Market Sparkles for a Canadian Company in Jul. 1981 issue of Water and Pollution Control Magazine Brochure entitled The Vitox System by The Gray Engineering Group.

Final Report–Oxygen Transfer and Headloss Characteristics of the Carborundum Dome by Gerry Shell Environmental Engineers.

Hinde Engineering Co., "Typical Air–Aqua System", published prior to Oct. 18, 1981, Exhibit A to Neal I. Shapiro Declaration.

Hinde Engineering Co., "Typical Air–Aqua Specifications", published prior to Oct. 18, 1981, Exhibit B to Neal I. Shapiro Declaration.

Hinde Engineering Co., "Operation and Maintenance Manual for Air–Aqua Systems", published prior to Oct. 18, 1981, Exhibit C to Neal I. Shapiro Declaration.

(List continued on next page.)

*Primary Examiner*—Ernest G. Therkorn

[57] ABSTRACT

A plurality of aerators are arranged in a preselected pattern on the floor of a basin or lagoon containing waste water. Compressed air is supplied to the aerators by aeration pipes anchored by hanger brackets to the floor of the basin. Each aerator has a porous diffuser plate through which the air is passed and released into the waste water in the form of ultra air bubbles less than 60 microns in diameter. The air bubbles are generated in an intense manner with a high rate of air flow to increase the mixing action and liquid circulation pattern, and to create turbulent boils at the surface which provide surface aeration from atmospheric air and re-entrainment of air from eddy current circulation.

OTHER PUBLICATIONS

Goeppner, J., "Sanitary landfills:No place for leaching", *Water & Wastes Engineering,* published Sep., 1975, Exhibit D. to Neal I. Shaprio Declaration.

McClelland Consulting Engineers, "DeQueen, Arkansas" Plans, cover and sheets 30-16 and 30-17, published Dec. 4, 1981, Exhibit A to Vernon D. Rowe Declaration.

McClelland Consulting Engineers, "DeQueen, Arkansas" Specifications, cover and pp. 38-41, published Dec. 4, 1981, Exhibit B to Vernon D. Rowe Declaration.

*Construction News,* Dec. 4, 1981, Exhibit C to Vernon D. Rowe Declaration.

*Construction News,* Jan. 8, 1982, Exhibit D to Vernon D. Rowe Declaration.

Lackey, R., "A Technique for Eliminating Thermal Stratification in Lakes", *Water Resources Bulletin,* vol. 8, No. 1, published Feb. 1972.

Goodhnow, W. E., "Regina Aerates Its Sewage Lagoon", *Water and Pollution Control,* published Dec., 1966.

Great Lakes–Upper Mississippi River Board of State Sanitary Engineers, "Recommended Standards for Sewage Works", 1978 Edition, pp. 80-8, 80-9.

State of Iowa, "Iowa Wastewater Facilities Design Standards", Apr. 25, 1979 pp. 18C-11 to 18C-13.

ITT Grinnell Corp., "Pipe Hangers", published 1975, pp. ph-69, ph-72, ph-125.

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1-7 is confirmed.

* * * * *